May 16, 1933.  R. F. MURAKAMI  1,908,780
AUTOMOBILE PEDAL SIGNAL SWITCH
Filed Feb. 11, 1929
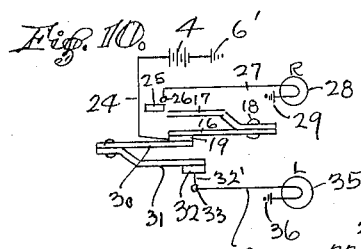
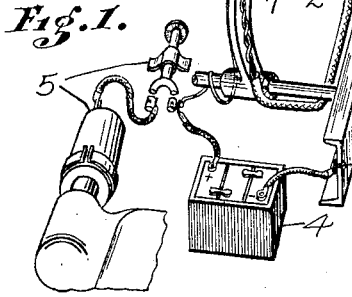
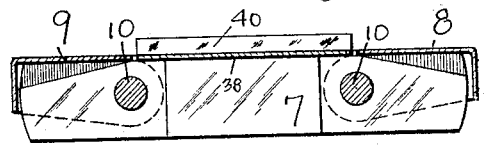
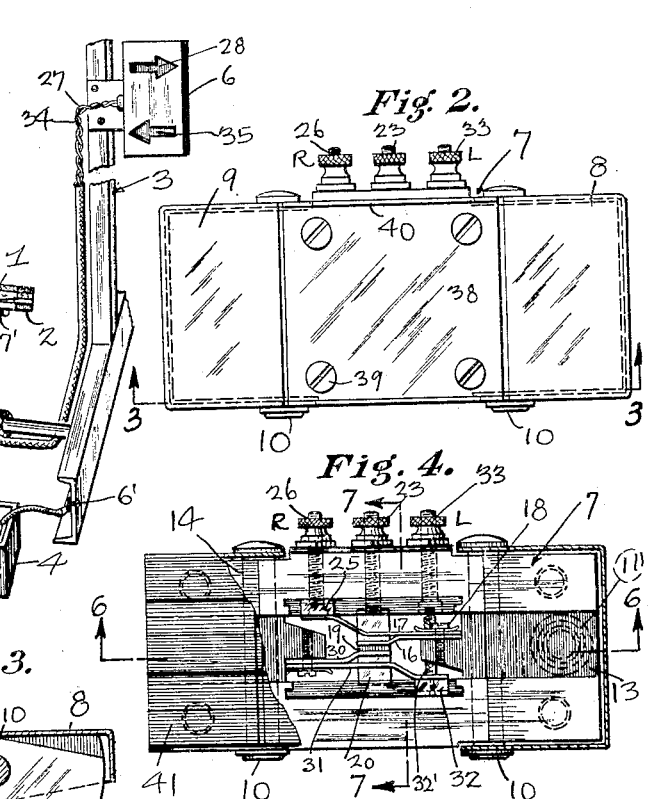
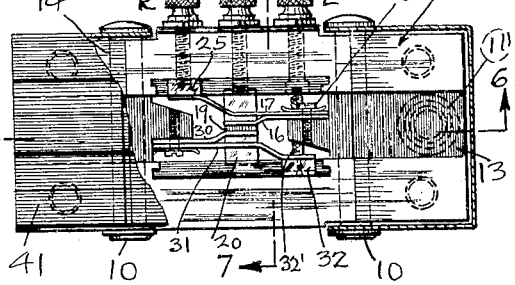
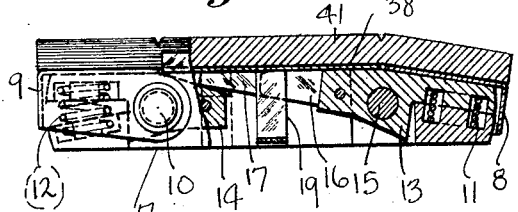
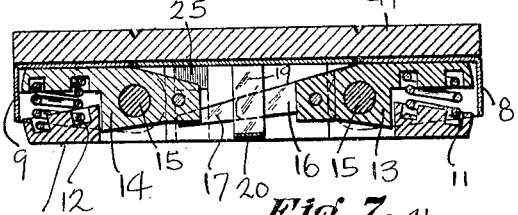
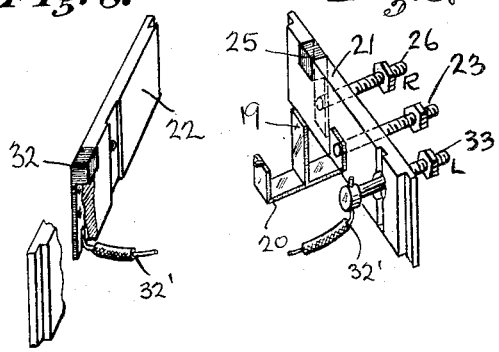
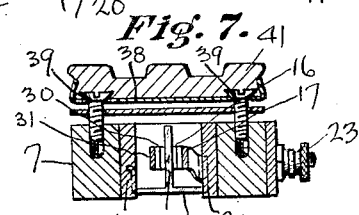
INVENTOR.
RIKUJI F. MURAKAMI
BY
ATTORNEYS.

Patented May 16, 1933

1,908,780

UNITED STATES PATENT OFFICE

RIKUJI F. MURAKAMI, OF SAN FRANCISCO, CALIFORNIA

AUTOMOBILE PEDAL SIGNAL SWITCH

Application filed February 11, 1929. Serial No. 339,192.

This invention relates to improvements in automobile direction indicating signals and more particularly to a novel and efficient switch for controlling the operation of such signals, said switch being attached to the top of the foot plate of one of the operating pedals, say the brake pedal of the automobile, and being selectively operable to actuate the signals responsive to a rocking movement of the foot of the driver when the foot is in the usual position of the pedal. This provides for a signal operation either simultaneously with the normal braking operation (or clutch operation if the switch is mounted on the clutch pedal), or independently thereof, and in either event leaves the hands and feet of the driver free to carry out the usual driving operation.

An object of the invention is to provide a pedal carried switch of the character described, which switch has selectively depressible end portions, that may be superimposed by a flexible rubber cover or tread strip, which strip will prevent slipping of the foot off the pedal, the depression of either end of the switch closing the circuit for one of the signals. For example, when the foot is rocked to the left, the left end of the switch is depressed and the circuit for the left turn signal is closed, whereas when the foot is rocked to the right, the right turn signal is operated.

Another object is to provide a switch of the character described which is of simple and inexpensive construction and may be easily attached to a brake pedal without changing the construction of the latter.

With the above mentioned and other objects in view, the invention consists in the novel construction and combination of parts hereinafter described, illustrated in the accompanying drawing, and set forth in the claims hereto appended, it being understood that various changes in the form, proportion, size and minor details of construction within the scope of the claims may be resorted to without departing from the spirit or sacrificing any of the advantages of the invention.

Referring to the drawing:

Fig. 1 is a schematic view of the switch as it would appear when installed with a right and left turn signal on the ordinary automobile, showing the parts in perspective.

Fig. 2 is a top plan view of the switch with the rubber cover or tread strip removed.

Fig. 3 is a sectional view taken on the plane of line 3—3 of Fig. 2.

Fig. 4 is a top plan view of the switch with the rubber strip broken away and the cover plate removed.

Fig. 5 is a side elevation of the switch with the major portion thereof broken away and shown in section and in the position assumed when operated to close the circuit for the right turn signal.

Fig. 6 is a longitudinal section taken on the line 6—6 of Fig. 4 with the switch open.

Fig. 7 is a cross sectional view taken on the line 7—7 of Fig. 4.

Fig. 8 is a perspective view of one of the elements of the switch.

Fig. 9 is a perspective view of another of the switch elements.

Fig. 10 is a diagrammatic view of the electrical circuits operated by the switch.

In one embodiment of my invention as illustrated in detail in the accompanying drawing, the switch generally designated 1 (in Fig. 1), is made up in the form of a small, compact rectilinear, and comparatively flat block adapted to be attached to the foot plate of the brake or clutch pedal 2 of the automobile, a part of which latter is shown at 3. This switch is connected, as will be hereinafter more fully described, with the usual automobile battery 4 and, as shown, may be connected in the line leading to the starting motor equipment, generally designated 5, said switch being also connected with an electrically operated signal such, for example, as the right and left turn signal designated 6. The battery is grounded as at 6'.

The switch is made up of a rectangular flat casing 7 adapted to be held by suitable fastenings 7' on the upper side of the pedal 2. At the ends of this casing, depressible treadle plates 8 and 9 are each pivoted as at 10, said plates being fitted over the ends of the casing 7 and normally held in up position by expansion springs 11 and 12. These springs press upwardly against switch members 13 and 14 which are pivoted between their ends as at 15 within the casing, and have their outer ends engaged with the under sides of the treadle plates 8 and 9 respectively.

Contact blades 16 and 17 are secured to the pivoted switch member 13 by means of a fastening 18, said contact blades being electrically engaged at their footed ends and spread apart at their free ends. The contact blade 16 at all times slidably engages one side of a fixed upright contact member 19 electrically joined with and carried by a U-shaped metal member 20, engaged at its ends with and held between insulation strips 21 and 22 dovetailed in opposite walls of the casing 7. This member 20 is connected with a binding post 23 on the casing 7 and a conductor 24 leads from said post to one terminal of the battery 4. The other contact blade 17 on the pivoted member 13 is adapted to be moved into and out of engagement with a fixed contact 25 carried by the insulation strip 21. A binding post 26 is connected with the contact 25 and a conductor 27 leads from said post to the signal 6 where said conductor (see Fig. 10) is connected with one side of the right turn signal element 28, the other side of said element being grounded as at 29.

The pivoted switch member 14 carries contact members 30 and 31 corresponding to the blades 16 and 17. The member 30 engages the other side of the contact member 19, whereas the member 31 is adapted to be moved into and out of engagement with a contact member 32 carried by the insulation strip 22. This member 32 is connected by conductor 32' with a binding post 33 from which a conductor 34 leads to the left turn signal element 35 (see Fig. 10), said element being grounded as at 36. The casing is closed on its upper side by a plate 38 held in place by a screw 39, said cover plate having edge flanges 40 which provide for holding a flexible rubber tread strip 41 on top of the casing, said strip covering the entire upper side of said casing and, of course, lying over the treadle plates 8 and 9. The rubber strip may be corrugated or otherwise roughened to prevent slipping of the foot.

It will be noted that the top side of the casing 7 is cut away at each end, whereby the treadle plates 8 and 9 may be flush with the casing top but yet depressed when pressure from the foot is applied to said treadle plates.

When it is desired to make a right turn signal, the operator with his foot placed on the pedal and lying on the rubber strip 41, rocks his foot to the right and thereby depresses the treadle 8 and rocks the member 14 against the action of the spring 11. This moves the contact 17 into engagement with the contact 25 and current flows from battery 4 through conductor 24 to contact 19, through contact 16, contact 17, contact 25 and then through conductor 27 to right turn signal element 28. The other side of said element 28 and the battery being grounded at 29 and 6' respectively, the circuit is thus closed for the right turn signal.

To make the left turn signal, the driver rocks his foot to the left and depresses treadle 9, thereby rocking member 14 and moving contact 30 into engagement with contact 32. Current then flows from battery 4 through conductor 24, contact 19, contact 30, contact 31, contact 32, conductor 34, to left turn element 35.

The construction and arrangement of the switch of this invention is such that the central portion of the switch provides a nonyielding foot rest on the pedal, whereas the end portions are yieldable and depressible when the foot is pressed thereon. By this arrangement a quick and easy selective operation of the switch is provided for and the driver need not remove his hands from the steering wheel or his feet from the operating pedals, in order to make a direction indicating signal. The device of this invention may be said to comprise a foot pedal having independent switches on opposite sides thereof in position to be readily operated by the foot.

I claim:

1. A switch mechanism of the character described comprising a flat casing adapted to be secured to a foot plate of an operating pedal; a depressible treadle plate pivoted to each end of the casing, resilient means on the casing to normally hold each treadle plate in alignment with the top of the casing; a fixed upright contact member in the casing between the said plates being connected to a source of electricity; a pair of contact blades secured to each treadle plate, the blades of each pair being connected at one end thereof and bent apart at their free ends; one blade of each pair being at all times in slidable engagement with said contact member; a pair of fixed terminal contacts on the casing, each disposed in operative relation to the free end of the other blade of the respective pairs of contact blades; said second blades being adapted to be moved into engagement with the respective fixed terminal contacts as the treadle plates are selectively depressed, thereby to close the circuit thru the respective companion blades thereof to said fixed contact member, said resilient means being arranged to limit the rocking of the blades and to transmit directly to the clutch pedal, force exerted thereon beyond said limit.

2. In a switch mechanism of the character described, a casing, a cover for the casing to serve as a rest for the foot of a driver of a vehicle, the opposite ends of the cover being depressible, oppositely disposed rockable switch blades in the casing below the cover, said depressible cover ends being arranged above the ends of the respective blades outside of the rocking pivots of the blades to turn the blades as the cover end is depressed, a stationary terminal contact in the casing in constant engagement with both rocking blades, another stationary terminal contact in operative relation to each blade to be contacted thereby as the respective ends of the cover are depressed, and resilient means in the casing to urge the blades out of engagement with said second stationary contacts, and to limit the depression of the cover to the extent of said contact engagement.

3. In a switch mechanism of the character described, a casing, a cover on the casing depressible at its ends, rockable supports in the casing below the cover, each being fulcrumed intermediate its ends and having an end thereof extended below the adjacent depressible cover end to be engaged by the latter, a stationary terminal contact intermediate the ends and side of the casing connected to a source of electricity, another stationary contact on each side of the casing, a blade on each support extended at one side of the support fulcrum, the blades extending substantially toward the opposite side contacts in the casing so as to engage the latter when the support is tilted around its fulcrum by a depressed end of the cover, and a contact branch on each blade in constant engagement with said first stationary terminal contact to take off electric current therefrom.

4. In a switch mechanism of the character described, a casing, a cover on the casing depressible at its ends, rockable supports in the casing below the cover, each being fulcrumed intermediate its ends and having an end thereof extended below the adjacent depressible cover end to be engaged by the latter, a stationary terminal contact intermediate the ends and side of the casing connected to a source of electricity, another stationary contact on each side of the casing, a blade on each support extended at one side of the support fulcrum, the blades extending substantially toward the opposite side contacts in the casing so as to engage the latter when the support is tilted around its fulcrum by a depressed end of the cover, a contact branch on each blade in constant engagement with said first stationary terminal contact to take off electric current therefrom, and a spring in the casing connected to each support to resist the depressing of the cover end and to return the support and the adjacent end of the cover to switch opening position when the latter is released.

5. A switch mechanism adapted to be attached to a clutch pedal of a vehicle, comprising a casing, a cover on the casing depressible at its ends, rockable supports fulcrumed in the casing below the cover being adapted to be engaged by the cover; electric contact means operatively connected to said supports to close an electric circuit when the supports are depressed; and means in the casing connected to the support to yieldably resist the depressing of the ends of the cover and to normally urge the support into circuit opening position, the said resisting means being arranged to yield independently of the clutch pedal, the portion of the cover between the depressible ends being connected to the casing to receive and transmit the force to operate the clutch independently of the depressible cover ends.

6. A switch mechanism adapted to be attached to a clutch pedal of a vehicle, comprising a casing, a cover on the casing depressible at its ends, rockable supports fulcrumed in the casing below the cover being adapted to be engaged by the cover; electric contact means operatively connected to said supports to close an electric circuit when the supports are depressed; means in the casing connected to the support to yieldably resist the depressing of the ends of the cover and to normally urge the support into circuit opening position, the said resisting means being arranged to yield independently of the clutch pedal, and means of connection between the cover and the casing to transmit directly through the casing, the force applied to operate the clutch.

In testimony whereof, I have hereunto set my hand at San Francisco, California, this 10th day of December, 1928.

RIKUJI F. MURAKAMI.